United States Patent

Noda et al.

(10) Patent No.: US 7,509,013 B2
(45) Date of Patent: Mar. 24, 2009

(54) TWO-DIMENSIONAL PHOTONIC CRYSTAL

(75) Inventors: Susumu Noda, Kyoto (JP); Takashi Asano, Kyoto (JP); Seiichi Takayama, Chuo-ku (JP); Ranko Hatsuda, Chuo-ku (JP)

(73) Assignee: TDK Corporation, Tokyo (JP)

( * ) Notice: Subject to any disclaimer, the term of this patent is extended or adjusted under 35 U.S.C. 154(b) by 24 days.

(21) Appl. No.: 11/795,991

(22) PCT Filed: Jan. 31, 2006

(86) PCT No.: PCT/JP2006/301580

§ 371 (c)(1),
(2), (4) Date: Nov. 7, 2007

(87) PCT Pub. No.: WO2006/080532

PCT Pub. Date: Aug. 3, 2006

(65) Prior Publication Data

US 2008/0112679 A1    May 15, 2008

(30) Foreign Application Priority Data

Jan. 31, 2005    (JP) .............................. 2005-022724

(51) Int. Cl.
*G02B 6/10* (2006.01)
(52) U.S. Cl. ...................... 385/129; 359/346
(58) Field of Classification Search ................ 385/129; 359/346
See application file for complete search history.

(56) References Cited

U.S. PATENT DOCUMENTS 6,738,551 B2    5/2004    Noda et al.

2002/0009277 A1    1/2002    Noda et al.

FOREIGN PATENT DOCUMENTS

JP    A 2000-310721    11/2000

(Continued)

OTHER PUBLICATIONS

Zhi-Yuan Li et al., "Large Absolute Band Gap in 2D Anisotropic Photonic Crystals," Physical Review Letters, vol. 81, No. 12, Sep. 1998, pp. 2574-2577.

(Continued)

*Primary Examiner*—Jennifer Doan
(74) *Attorney, Agent, or Firm*—Oliff & Berridge, PLC

(57) ABSTRACT

An objective of the present invention is to provide a two-dimensional photonic crystal in which a complete photonic band gap (PBG), i.e. a photonic band gap that is effective for both a TE-polarized light and a TM-polarized light within a predetermined wavelength range, is created and an adequate width of the complete PBG can be ensured. A slab-shaped body 21 consisting of a birefringent material is provided with holes 22 periodically arranged in a triangular lattice pattern, where a plane shape of the hole is an equilateral triangle. The PBG for the TE-polarized light and the PBG for the TM-polarized light can be independently set by adjusting anisotropy in the refractive index of the body 21, i.e. a refractive index in a direction vertical to the body 21 and a refractive index in a direction parallel to the body 21. This construction makes it possible to ensure an adequate width of the complete PBG.

12 Claims, 5 Drawing Sheets

FOREIGN PATENT DOCUMENTS

| | | |
|---|---|---|
| JP | A 2001-272555 | 10/2001 |
| JP | A 2004-294517 | 10/2004 |
| JP | A 2005-250202 | 9/2005 |

OTHER PUBLICATIONS

Tomoyuki Aoyagi et al., "Fabrication of polarization splitting films with a large split angle composed of slant Si microcolums," Faculty of engineering, Utsunomiya University, 1997, p. 174.

(a)

→ Γ – J DIRECTION
↓ Γ – X DIRECTION (b)

TWO-DIMENSIONAL PHOTONIC CRYSTAL

TECHNICAL FIELD

The present invention relates to a two-dimensional photonic crystal used for optical devices such as an optical multiplexer/demultiplexer. It should be noted that the term "light" or "optical" used in this patent application includes electromagnetic waves in general as well as visible light.

BACKGROUND ART

Since optical communication is a technique that could play a central role in future broadband communications, the optical components used in optical communication systems are required to be higher in performance, smaller in size, and lower in price for widespread use of the optical communication. Optical communication devices using photonic crystals are one of the leading candidates for the next-generation optical communication components that satisfy the above-described requirements. Some of the optical communication devices have already been put into practical use, and an example is a photonic crystal fiber for polarized light dispersion compensation. Furthermore, recent efforts have had a practical goal of developing optical multiplexers/demultiplexers and other devices that can be used in wavelength division multiplexing (WDM) communication.

A photonic crystal is a dielectric object having a periodic structure. Usually, the periodic structure is created by providing the dielectric body with a periodic arrangement of modified refractive index areas, i.e. the areas whose refractive index differs from that of the body. Within the crystal, the periodic structure creates a band structure with respect to the energy of light and thereby produces an energy region in which the light cannot be propagated. Such an energy region is called the "photonic band gap (PBG)".

Providing an appropriate defect in the photonic crystal creates a specific energy level within the PBG ("defect level"), and only a ray of light having a wavelength corresponding to the defect level is allowed to be present in the vicinity of the defect. A defect created in a point pattern can be used as an optical resonator that resonates with light having a specific wavelength, and a linear defect can be used as a waveguide.

As an example of the above-described technique, Patent Document 1 discloses a two-dimensional photonic crystal having a body (or slab) provided with a periodic arrangement of modified refractive index areas, in which a linear defect of the periodic arrangement is created to form a waveguide and a point-like defect is created adjacent to the waveguide. This two-dimensional photonic crystal functions as the following two devices: a demultiplexer for extracting a ray of light whose wavelength equals the resonance wavelength of the resonator from rays of light having various wavelengths and propagated through the waveguide and for sending the extracted light to the outside; and a multiplexer for introducing the same light from the outside into the waveguide.

Many two-dimensional photonic crystals including the one described in Patent Document 1 are designed so that the PBG becomes effective for either a TE-polarized light, in which the electric field oscillates in the direction parallel to the body, or a TM-polarized light, in which the magnetic field oscillates in the direction parallel to the body. In this case, if the PBG is not created for the other polarized light or created in an energy region which differs from that of the PBG of the given polarized light, the TE-polarized light and the TM-polarized light cannot be simultaneously used in the same frequency, wavelength and energy.

Taking the above problem into account, studies have been conducted to create a two-dimensional photonic crystal having a PBG for each of the TE-polarized light and the TM-polarized light in which the two PBGs have a common band. This common band is called the "complete photonic band gap (complete PBG)" hereinafter. For example, Patent Document 2 discloses a two-dimensional photonic crystal which has a complete PBG created by arranging triangular (or triangle-pole-shaped) holes (i.e. modified refractive index areas) in a triangular lattice pattern in a slab-shaped body, for example. This two-dimensional photonic crystal is capable of using the TE-polarized light and the TM-polarized light simultaneously in light whose frequency is within the complete PBG.

[Patent Document 1] Japanese Unexamined Patent Application Publication No. 2001-272555 ([0023]-[0027], [0032], FIGS. 1 and 5-6)

[Patent Document 2] Japanese Unexamined Patent Application Publication No. 2004-294517 ([0021]-[0022], [0041]-[0043], FIGS. 1 and 13-18)

DISCLOSURE OF THE INVENTION

Problem to be Solved by the Invention

The complete PBG will be further explained using FIG. 1. A common energy region between a PBG for the TE-polarized light (TE-PBG) 11 and a PBG for the TM-polarized light (TM-PBG) 12 becomes a complete PBG 13. If the complete PBG 13 is large, it is effective to expand the width of energy (or frequency and wavelength) in which the TE-polarized light and the TM-polarized light can be used simultaneously. If this two-dimensional photonic crystal is used as a wavelength multiplexer/demultiplexer for example, the number of frequencies (or wavelengths) in which the TE-polarized light and the TM-polarized light can be both multiplexed/demultiplexed is increased in accordance with the increase of the complete PBG, so that a transmission amount of information in the WDM per unit time can be increased.

In order to increase the PBG 13, either one or both of energy regions of the TE-PBG 11 and the TM-PBG 12 should be shifted to expand an energy region overlapped by the two PBGs. For example, the TE-PBG 11 is shifted to a high energy side from a state (a-1) where energy regions of the TE-PBG 11 and the TM-PBG 12 are partially overlapped to form the complete PBG 13, so that the energy region of the TM-PBG 12 is made to be entirely included in the energy region of the TE-PBG 11 (a-2) and thereby the complete PBG can be increased, as shown in FIG. 1. In order to shift the energy regions of the TE-PBG 11 and the TM-PBG 12, adjustments should be made in parameters such as the period (i.e. lattice constant), size and shape of the modified refractive index areas, the thickness of the body, and the refractive index of the body and the modified refractive index areas. However, a relationship among such parameters, the TE-PBG 11 and the TM-PBG 12 is not independent from each other and if parameters are set to shift either one of the energy regions of the PBGs, the energy region of the other PBG is also shifted. It is therefore difficult to increase the complete PBG 13 in this method.

Moreover, the aforementioned parameters have the following problems with respect to the refractive index of the body. The PGB is generally made larger in accordance with the increase in the refractive index of the body, causing light to be easily confined in the body. Accordingly, it is possible to employ a method to increase both the TE-PGB and the TM-PGB by using materials having a large refractive index in the body in order to increase the complete PGB. However, if the two-dimensional photonic crystal has an error in the diameter and shape of the holes generated at the time of manufacturing, a larger refractive index of the body causes a larger difference in the refractive index between the body and the holes, so that the two-dimensional photonic crystal becomes more susceptible to the error. As a result, there is a problem that optical characteristics are decreased and light loss is easily generated.

One objective of the present invention is to provide a two-dimensional photonic crystal in which the TE-PBG and the TM-PBG can be independently adjusted to allow expansion of the complete PBG.

Means for Solving the Problem

A two-dimensional photonic crystal achieved to solve the above problem according to the present invention is characterized in that:

a) a body includes a slab-shaped birefringent material;

b) a direction of the slab-shaped birefringent material is set so that a refractive index for light whose electric field oscillates in a direction vertical to the body differs from a refractive index for light whose electric field oscillates in a direction parallel to the body;

c) multiple numbers of modified refractive index areas whose refractive index differs from that of the body are periodically arranged in the body; and d) the shape and arrangement of the modified refractive index areas are set so that a photonic band gap for the TM-polarized light and a photonic band gap for the TE-polarized light have a common energy region.

In the present invention, the "birefringent material" indicates general materials in which a refractive index sensed by light is different depending on at least an oscillation direction of an electric field of the light, and includes not only single crystals such as rutile ($TiO_2$) for example but also polycrystalline substances having a unique structure such as an oriented columnar structure whose columnar fine crystals are oriented in a fixed direction. In this case, such a unique structure is added to isotropic single crystals such as Si to make it possible to constitute the body as a birefringent material in the present invention.

In the present application, by the term "refractive index in the vertical direction" is meant a refractive index for light whose electric field oscillates in a direction vertical to the body, and by the term "refractive index in the horizontal direction" is meant a refractive index for light whose electric field oscillates in a direction parallel to the body. Moreover, by the term "isotropic" used in the refractive index is meant that the refractive index does not rely on an oscillation direction of an electric filed of light.

A 3m-symmetrical shape can be used for the aforementioned modified refractive index areas. It is also desirable that the aforementioned modified refractive index areas are made by holes.

It is possible to form a waveguide including a linear defect of the modified refractive index areas and form a resonator including a point-like defect of the modified refractive index areas in the aforementioned body. Therefore, optical function elements such as wavelength multiplexers/demultiplexers and polarization multiplexers/demultiplexers can be constituted.

EXPLANATION OF NUMERALS 11, 31a, 31b, 51 . . . TE-PBG
12, 32a, 32b, 52 . . . TM-PBG
13, 33a, 33b, 53 . . . Complete PBG
20 . . . Two-dimensional photonic crystal
21, 45 . . . Body
22, 46 . . . Hole
23 . . . Waveguide
24 . . . Resonator
41 . . . Substrate
42 . . . Ion beam
43 . . . Columnar fine crystal
44 . . . Si-oriented columnar structure

MODES FOR CARRYING OUT THE INVENTION AND THEIR EFFECTS

The two-dimensional photonic crystal according to the present invention has a slab-shaped (or planner) body created by a birefringent material. The direction of the birefringent material is set so that a refractive index in a vertical direction differs from a refractive index of a parallel direction. Anisotropy in the refractive index of the body can be set by a direction of a crystal axis if the birefringent material is a single crystal such as rutile and by an orientation direction of columnar fine crystals if the birefringent material has an oriented columnar structure.

The body thus created is provided with a periodic arrangement of multiple numbers of modified refractive index areas, so that a TE-PGB being a PGB for the TE-polarized light and a TM-PGB being a PGB for the TM-polarized light are formed. Those who are skilled in the art are easily capable of deciding how to arrange the modified refractive index areas in order to form the TE-PGB and the TM-PGB from many experiences in the conventional isotropic materials. For example, the TE-PBG and the TM-PBG can be both formed by a triangular lattice pattern arrangement of the modified refractive index areas of a symmetrical shape that has a trigonal axis and a vertical symmetry plane including the axis (ex. equilateral triangle). This symmetry can be expressed as "3m" in Hermann-Mauguin notation or "C3v" in Schoenflies notation. To create the modified refractive index area, a material whose refractive index differs from that of the body can be embedded into the body, but it is desirable to make it including a hole in the body because this design is easier to manufacture.

Figure 1:
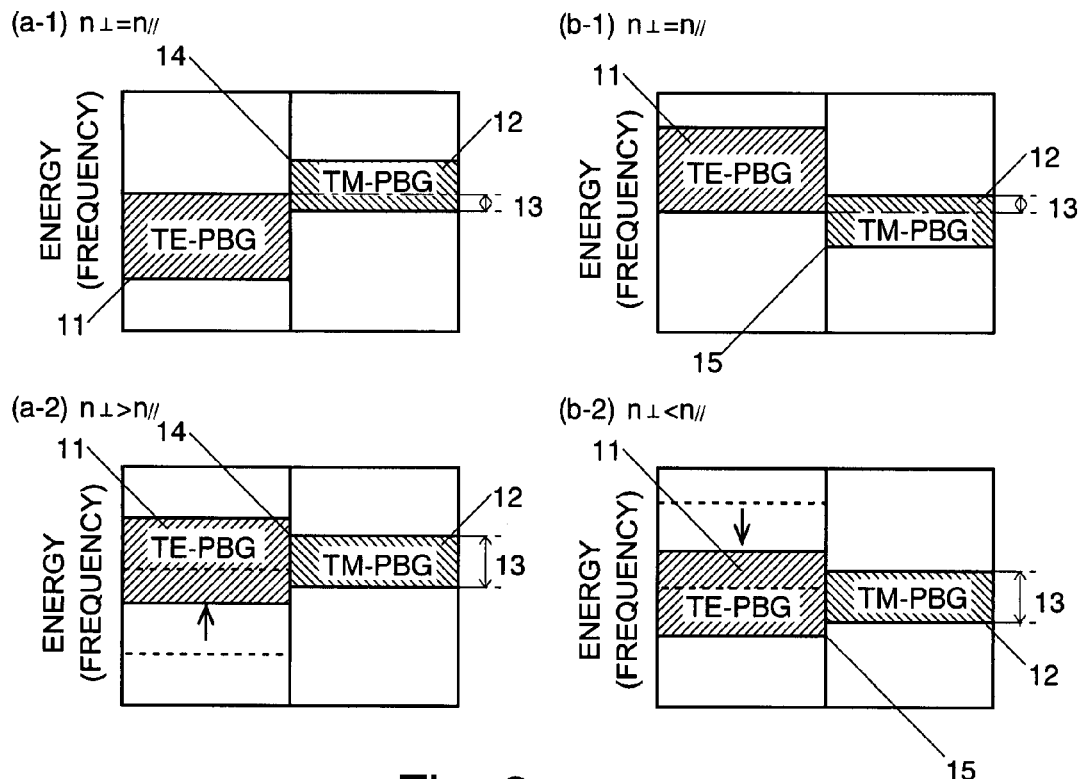
FIG. 1 is a diagram to explain that a complete PBG is increased by using a two-dimensional photonic crystal according to the present invention.
Figure 2:
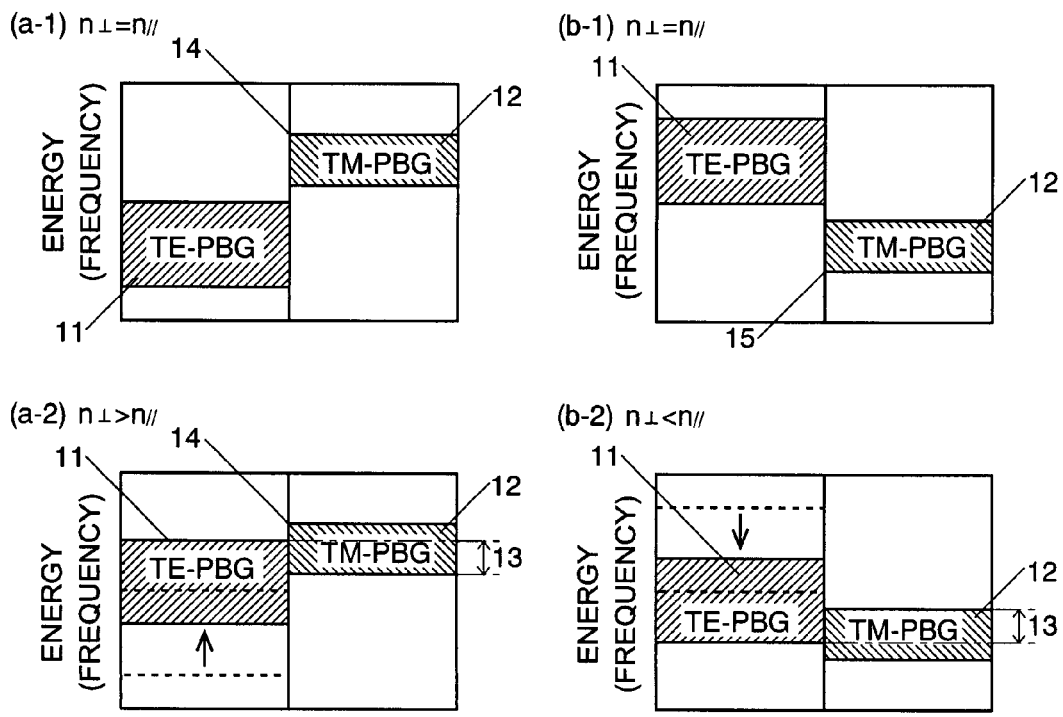
FIG. 2 is a diagram to explain that the complete PBG is formed by using the two-dimensional photonic crystal according to the present invention.

The direction of the birefringent material is appropriately set in the present invention so that a refractive index $n\perp$ in the vertical direction differs from a refractive index $n_{//}$ in the parallel direction, and the difference in the refractive index between the two directions allows the TE-PGB and the TM-PGB to be changed in a substantially independent state. For example, the shape and arrangement period of the modified refractive index areas are initially determined so as to form both the TE-PBG and the TM-PBG by the aforementioned method assuming that a refractive index of the body is isotropic. Next, a relationship between the TE-PBG and the TM-PBG at this time is used to determine the direction of the birefringent material as follows. (i) If a terminal portion 14 on a high energy side of the TM-PBG is present on a higher energy side than the TE-PBG in an isotropic refractive index of the body (i.e. the case where the complete PBG 13 is formed as shown in FIG. 1($a$-1) and the case where the complete PBG is not formed as shown in FIG. 2($a$-1) are both included), the direction of the birefringent material is set to be $n\perp > n_{//}$. (ii) If a terminal portion 15 on a low energy side of the TM-PBG is present on a lower energy side than the TE-PBG in an isotropic refractive index of the body (i.e. the case where the complete PBG 13 is formed as shown FIG. 1($b$-1) and the case where the complete PBG is not formed as shown in FIG. 2($b$-1) are both included), the direction of the birefringent material is set to be $n\perp < n_{//}$.

In the case of (i), the refractive index $n\perp$ in the vertical direction which is an oscillation direction of an electric field of the TM-polarized light is made larger than the refractive index $n_{//}$ in the horizontal direction, so that the TE-PBG 11 is shifted to a high energy side relative to the TM-PBG 12, and the complete PBG 13 is increased as shown in FIG. 1($a$-2). Moreover, when the complete PBG is not formed in an isotropic refractive index of the body as shown in FIG. 2($a$-1), the TE-PBG 11 is shifted to a high energy side relative to the TM-PBG 12 due to $n\perp > n_{//}$, and the complete PBG is formed.

In the case of (ii), the refractive index $n_{//}$ in the parallel direction which is an oscillation direction of an electric field of the TE-polarized light is made larger than the refractive index $n\perp$ in the vertical direction, so that the TE-PBG 11 is shifted to a low energy side relative to the TM-PBG 12, and the complete PBG 13 is increased as shown in FIG. 1($b$-2). Moreover, when the complete PBG is not formed in an isotropic refractive index of the body as shown in FIG. 2($b$-1), the TE-PBG 11 is shifted to a low energy side relative to the TM-PBG 12 due to $n\perp < n_{//}$, and the complete PBG 13 is formed.

The two-dimensional photonic crystal thus created is provided with a linear defect of the modified refractive index areas, so that a waveguide in which the TE-polarized light and the TM-polarized light can be both propagated in a predetermined frequency band within the complete PBG 13 can be formed. A resonator which resonates with both of the polarized light in a predetermined frequency within the complete PBG 13 can also be formed by creating a point-like defect of the modified refractive index areas. It is of course possible to form a resonator which resonates exclusively with either the TE-polarized light or the TM-polarized light. These waveguide and resonator can be formed by a method similar to that of the conventional two-dimensional photonic crystal disclosed in Patent Document 1 or other documents.

The two-dimensional photonic crystal having a waveguide formed as described above and a resonator arranged in the vicinity of the waveguide functions as an optical demultiplexer for demultiplexing light whose wavelength and polarization resonate in the resonator from the waveguide. The same constitution as described above also allows the two-dimensional photonic crystal to become an optical multiplexer for multiplexing the light of the wavelength and polarization into the waveguide. Moreover, multiple numbers of resonators having a mutually different wavelength and polarization plane of light to resonate are provided in the vicinity of the waveguide, so that superimposed rays of light having plural kinds of wavelengths and polarization planes that propagate through the waveguide can be demultiplexed from each of the resonators in every wavelength and polarization plane. It is the same in the case of multiplexing. Since the complete PBG can be increased in the two-dimensional photonic crystal according to the present invention, it is possible to increase the number of frequencies (or wavelengths) in which light can be multiplexed/demultiplexed, and thereby a transmission amount of information in the WDM per unit time can be increased.

EFFECTS OF THE INVENTION

The present invention uses a birefringent material in the body in which the refractive index $n\perp$ in the vertical direction and the refractive index $n_{//}$ in the parallel direction are appropriately set, so that the TE-PBG and the TM-PBG can be independently adjusted. Therefore, the two-dimensional photonic crystal having a large complete PBG can be obtained more easily than a case where isotropic materials are used. The two-dimensional photonic crystal as described above makes it possible to obtain a wavelength multiplexer/demultiplexer in which plural kinds of light having a different wavelength and polarization plane can be demultiplexed/multiplexed.

According to the present invention, the complete PBG can also be formed by creating the body using materials with a comparatively small refractive index. Influences caused by an error in a diameter and shape of the holes generated at the time of manufacturing can be minimized by using such materials whose refractive index is comparatively small.

EMBODIMENTS

Embodiments of the two-dimensional photonic crystal according to the present invention will be explained using FIG. 3 to FIG. 9.

Figure 3:
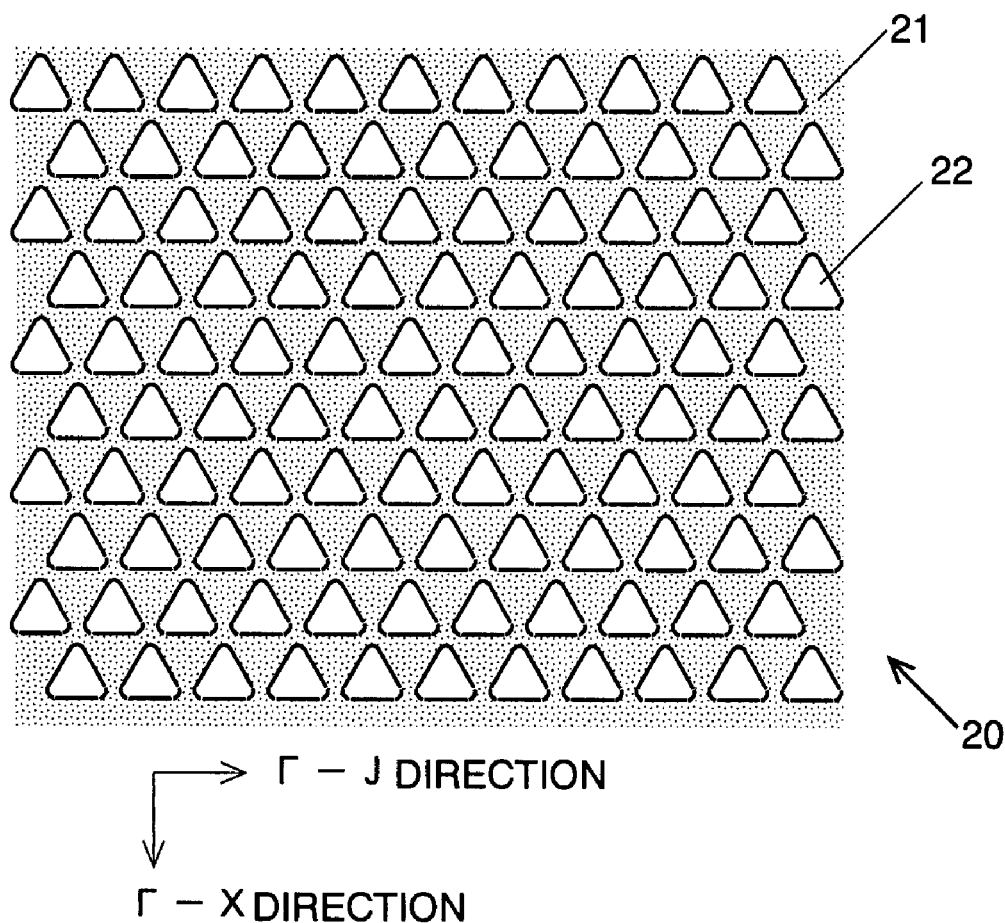
FIG. 3(a) is a top-surface view of a first embodiment of the two-dimensional photonic crystal according to the present invention.
FIG. 3(b) is a cross-sectional view of the two-dimensional photonic crystal showing orientation directions of a rutile crystal.
Figure 3:
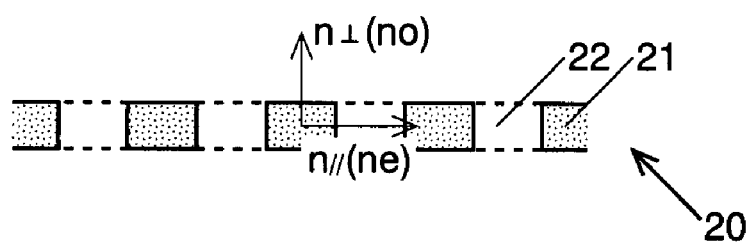

FIG. 3($a$) is a plane view of a two-dimensional photonic crystal 20 in a first embodiment. The two-dimensional photonic crystal 20 of the first embodiment uses rutile ($TiO_2$) as a material of a body 21. Rutile is a uniaxial crystal of a tetragonal system and has an effective refractive index including an ordinary ray refractive index no of 2.45 and an extraordinary ray refractive index ne of 2.71 with respect to light whose band is 1.55 μm. In the case of rutile, no is a refractive index for light in a direction vertical to a c axis of the crystal, and ne is a refractive index for light in a direction parallel to the c axis thereof. The slab-shaped body 21 is created so that the c axis of the rutile crystal is disposed in a direction parallel to the body 21 and in a Γ-J direction as shown in FIG. 3($b$). A slab having the rutile crystal thus oriented can be fabricated by using a usual method for manufacturing TiO$_2$ films. Although TiO$_2$ includes anatase whose crystal structure differs from that of rutile, anatase has a slight difference between no and ne (no=2.554, ne=2.493) and thereby rutile is used in the first embodiment as described above.

Holes 22 are periodically arranged in a triangular lattice pattern in the body 21. The plane shape of the holes 22 is an equilateral triangular shape with a rounded corner. As disclosed in Patent Document 2, the two-dimensional photonic crystal having holes of this shape and arrangement is known to have both the TE-PBG and the TM-PBG even if the body has an isotropic refractive index.

An energy band was calculated for a two-dimensional photonic crystal of a comparative example (a) and the two-dimensional photonic crystal 20 of the first embodiment (b). The two-dimensional photonic crystal of the comparative example has a same constitution with the two-dimensional photonic crystal 20 of the first embodiment except for an isotropic refractive index of the body. The refractive index of the body in the comparative example is 2.45 which is the same value with no of rutile in the both vertical and horizontal directions to the body. The other parameters were set as follows: the lattice constant of the triangular lattice is 600 nm, the thickness of the body is 720 nm, the curvature radius of corner portions of the equilateral triangular holes 22 is 120 nm, and the ratio of volume occupied by the holes 22 within the two-dimensional photonic crystal 20 (i.e. filling factor) is 0.62. A three-dimensional finite-difference time-domain (3D-FDTD) method was used for the calculation.

Figure 4:
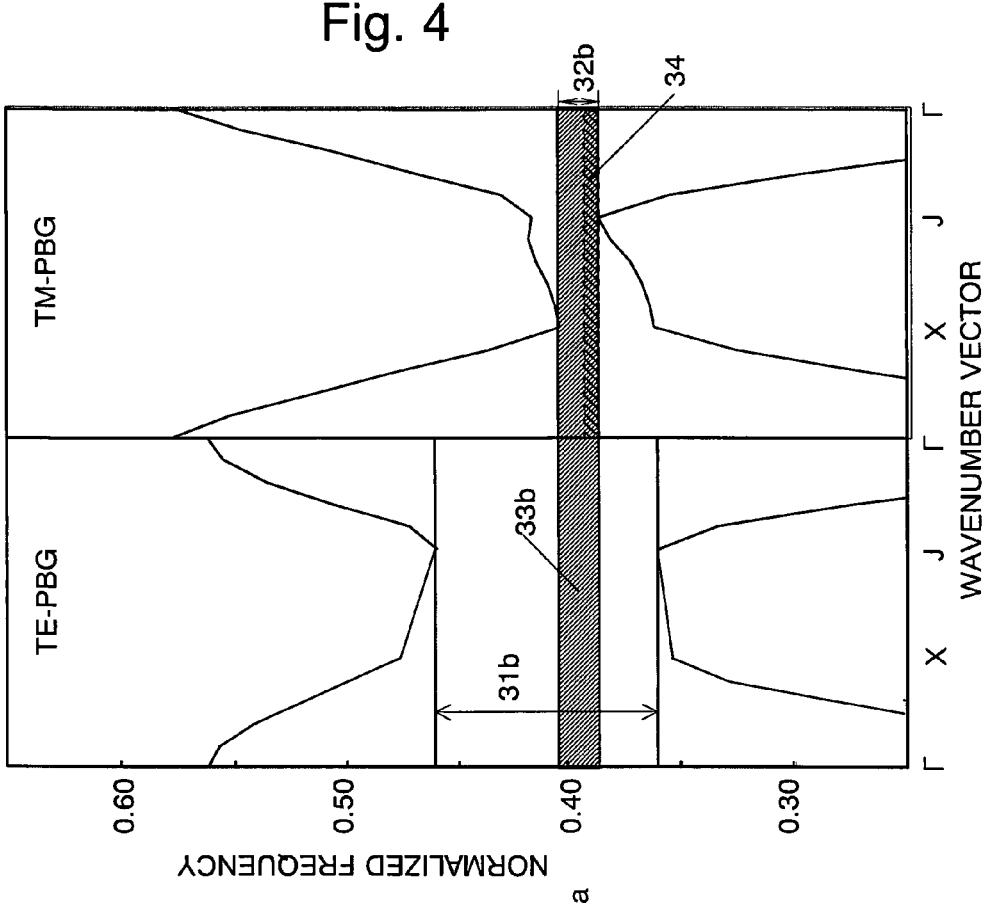
FIG. 4 is a set of graphs showing the result of band calculation for a two-dimensional photonic crystal of a comparative example (a) and that of a first embodiment (b).
Figure 4:
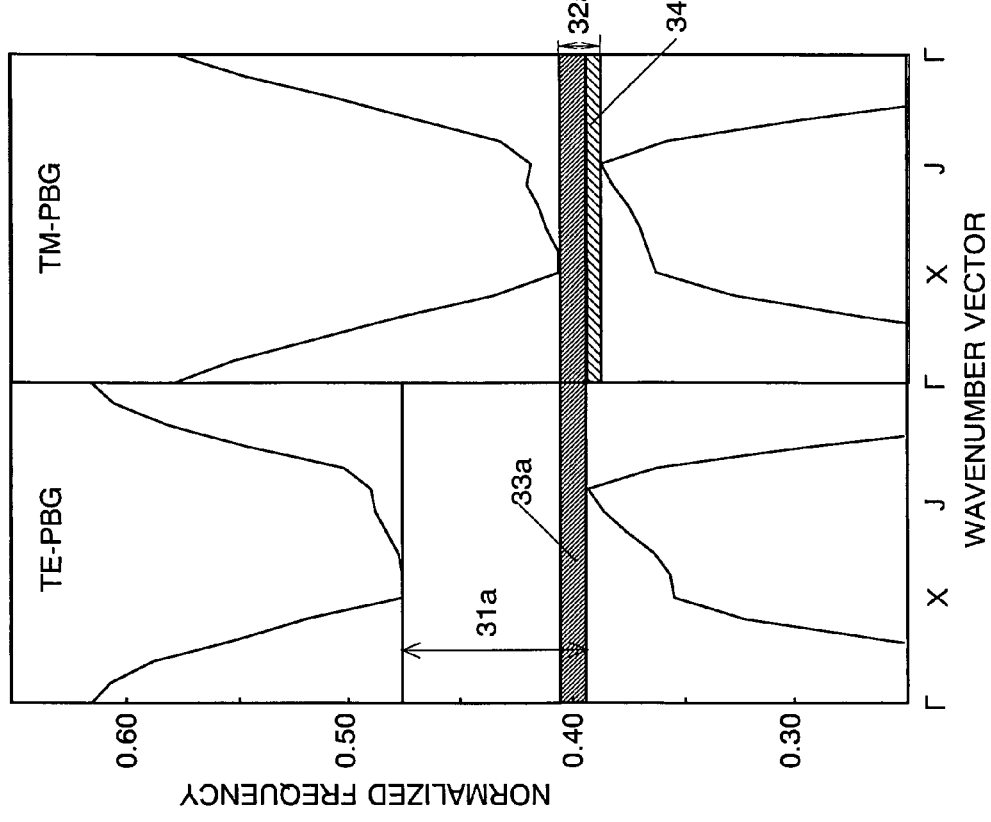

FIG. 4 shows a result of a band calculation. A vertical axis in FIG. 4 is a normalized frequency in which a frequency is divided by c/a (c is a light speed). In the comparative example (a), a TE-PBG 31$a$ and a TM-PBG 32$a$ are both formed, and an energy (or frequency) region of the TM-PBG 32$a$ is partially common to an energy region of the TE-PBG 31$a$. This common energy region is a complete PBG 43$a$. The width of energy (or frequency) of the complete PBG 43$a$ is 3.1%. The width of the complete PBG here is defined by a value which is obtained by dividing a central value of the complete PBG using a difference between an upper limit value and a lower limit value thereof. A portion 34 which is not included in an energy region of the TE-PBG 31$a$ is present on a low energy (or low frequency) side of the TM-PBG 32$a$. When a similar calculation was performed for a case where the refractive index of the body is isotropic and the same value (2.71) with ne of rutile, the width of the complete PBG was 3.4% (not shown).

On the contrary, a first embodiment (b) is similar to a comparative example (a) in a point that a TE-PBG 31$b$ and a TM-PBG 32$b$ are both formed, but the width of an complete PBG 43$b$ is 4.6% which is wider than the width of the complete PBG 43$a$ of the comparative example (a) and a width of a complete PBG obtained when the refractive index of the body is 2.71. It is because of the following reasons.

The TE-PBG 31$b$ is formed on a lower energy (or lower frequency) side than the TE-PBG 31$a$, as opposed to the TM-PBG 32$b$ and the TM-PBG 32$a$ that are formed in the same energy region and have the same width accordingly. It is because the refractive index of the PBG for the TE-polarized light whose electric field oscillates in a direction parallel to the body is larger in the first embodiment than that of the comparative example in the direction, as opposed to the PBG for the TM-polarized light whose electric field oscillates in a direction vertical to the body in which the refractive index remains the same in the comparative example and the first embodiment in the direction. The TE-PBG 31$b$ is thus formed on a lower energy side than the TE-PBG 31$a$, so that the portion 34 which is present on a low energy (low frequency) side of the TM-PBG 32$a$ and not included in the energy region of the TE-PBG 31$a$ is also made to be included in the energy region of the TE-PBG 31$b$ in the TM-PBG 32$b$, and thereby the width of the complete PBG is made larger than that of the comparative example (a).

Explained next will be a second embodiment of the two-dimensional photonic crystal in which an oriented columnar structure including Si is used in the body.

Figure 5:
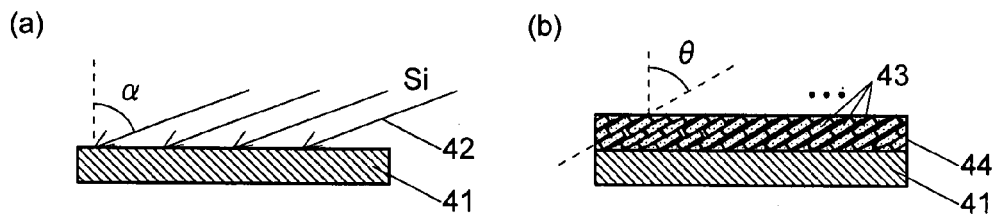
FIG. 5 is a cross-sectional view to explain a method for manufacturing an oriented columnar structure including Si.

First explained will be a method for manufacturing the oriented columnar structure including Si using FIG. 5. Ion beams 42 of Si are irradiated on a substrate 41 consisting SiO$_2$ in a direction oblique to a surface of the substrate 41 ($a$). Therefore, an Si-oriented columnar structure 44 in which columnar fine crystals 43 of Si grow in a direction oblique to the surface of the substrate 41 can be obtained (b). A growth angle θ of the columnar fine crystals 43, (i.e. an angle made by the normal line on the surface of the substrate 41 and a long axis of the columnar fine crystals 43), is made larger in accordance with the increase of an incident angle α of the ion beams 42, (i.e. an angle made by the perpendicular line to the surface of the substrate 41 and the ion beam 42). The Si-oriented columnar structure with θ of 58 to 59 degrees can be obtained by setting the incident angle of the ion beams 42 close to 90 degrees. Details of the Si-oriented columnar structure are described in "Proceedings of the 1997 IEICE (the Institute of Electronics, Information and Communication on Engineers) electronics society conference" p. 174, lecture number C-3-65, "Okina Henko Bunnri Tokusei Wo Yuusuru Naname Haikou Hashirajou Si Maku No Sakusei (Fabrication of polarization splitting films with a large split angle composed of slant Si microcolumns)", Author: Tomoyuki AOYAGI et al.

Figure 6:
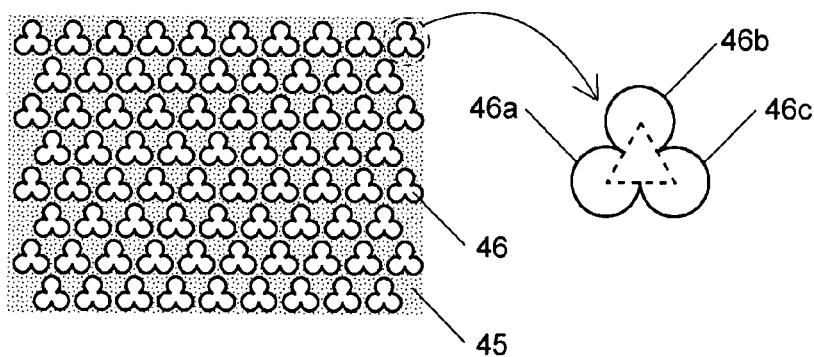
FIG. 6 is a top-surface view of a second embodiment of the two-dimensional photonic crystal according to the present invention.

The Si-oriented columnar structure 44 thus obtained is used as a body 45, and holes 46 are periodically arranged in the body to obtain the two-dimensional photonic crystal of the second embodiment. In the present embodiment, three columns 46$a$, 46$b$ and 46$c$ are arranged in an equilateral triangular shape to form each one of the holes 46 as shown in FIG. 6.

The Si-oriented columnar structure has a polarization separation angle of 27 degrees when θ is 59 degrees, with respect to a light whose wavelength is 1.55 μm. The Si-oriented columnar structure having such a growth angle θ of the columnar fine crystals 43 is used in the body, so that anisotropy is generated in the refractive index of the body with the ordinary ray refractive index no of 3.46 and the extraordinary ray refractive index ne of 4.00.

Figure 7:
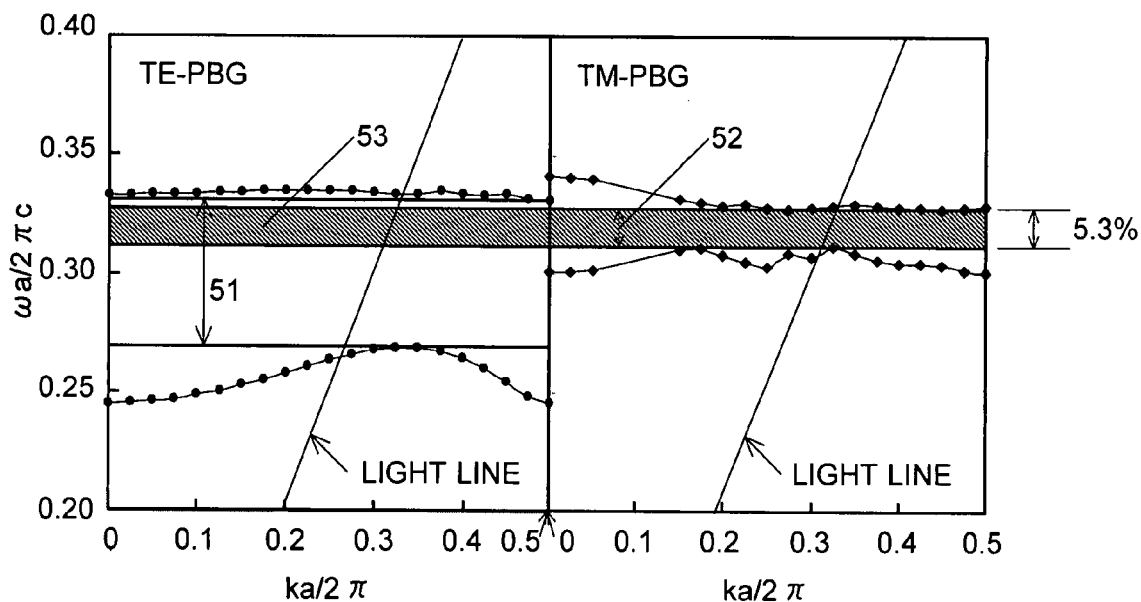
FIG. 7 is a graph showing a result of band calculation for the two-dimensional photonic crystal of the second embodiment.
Figure 8:
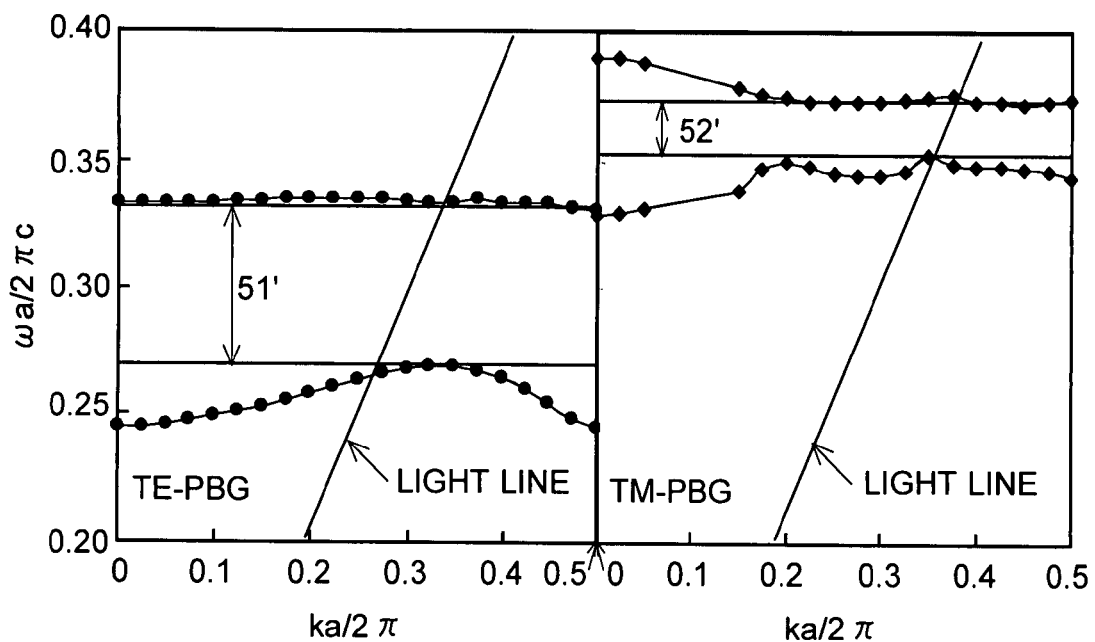
FIG. 8 is a graph showing a result of band calculation for the two-dimensional photonic crystal of a comparative example.

FIG. 7 shows a result of the band calculation using the 3D-FDTD method in the two-dimensional photonic crystal in which the body consisting of the Si-oriented columnar structure has the ordinary ray refractive index no of 3.46 and the extraordinary ray refractive index ne of 4.00. It is assumed that the lattice constant of the triangular lattice is 420 nm, a thickness of the body 44 is 336 nm, the three circles 46$a$, 46$b$ and 46$c$ to form each of the holes 46 have the radius r of 84 nm, and the distance of the mutual center points among the circles 46$a$, 46$b$ and 46$c$ is 168 nm. FIG. 8 also shows a result of the band calculation performed for the conventional two-dimensional photonic crystal as a comparative example which differs from the second embodiment only in a point that the body has an isotropic refractive index of 3.46. In the two-dimensional photonic crystal of the comparative example, a TE-PBG 51' and a TM-PBG 52' do not have a common energy (or frequency) region. That is, the complete PBG is not formed in the comparative example. On the contrary, the two-dimensional photonic crystal of the second embodiment exhibits that an energy region of a TM-PBG 52 is entirely included in an energy region of a TE-PBG 51 and thereby the entire energy region of the TM-PBG 52 becomes a complete PBG 53. This is because anisotropy of the refractive index owned by the Si-oriented columnar structure causes the TM-PBG 52 to be shifted to a lower energy side than the TM-PBG 52'. The width of the complete PBG 53 is 5.3%.

Figure 9:
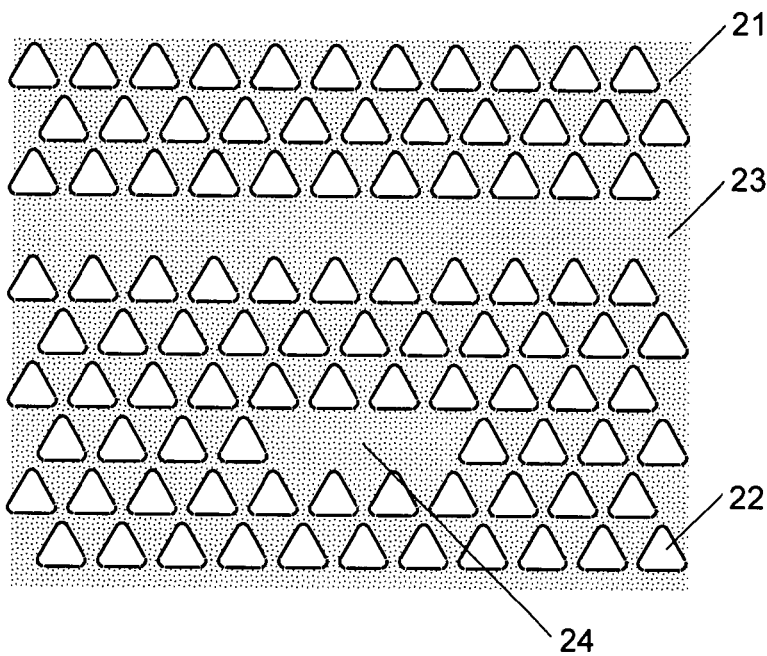
FIG. 9 is a top-surface view of one embodiment of a wavelength multiplexer/demultiplexer using the two-dimensional photonic crystal according to the present invention.

FIG. 9 shows an example of a wavelength multiplexer/demultiplexer using the two-dimensional photonic crystal according to the present invention. The body 21 and the holes 22 are created in the same manner with the two-dimensional photonic crystal shown in FIG. 3. A linear defect which is a space of a linear shape without having a periodic structure provided by the holes 22 is further formed in the body 21. This linear defect becomes a waveguide 23. A resonator 24 consisting of a point-like defect is also formed in the vicinity of the waveguide 23. FIG. 9 shows an example of forming the resonator 24 by having a point-like defect made by three of the linearly arranged holes 22 in a position separated from the waveguide 23 via three columns of the holes 22. The frequency (or wavelength) and polarization plane of light, which resonates in the resonator 24, can be set by adjusting parameters such as a shape, size and position of the point-like defect in the same manner with the conventional two-dimensional photonic crystal. This wavelength multiplexer/demultiplexer is capable of demultiplexing light whose frequency and polarization plane resonate in the resonator 24 from the waveguide 23 to the outside of the crystal, and multiplexing the light of this wavelength and polarization plane from the outside of the crystal into the waveguide 23.

Each ray of light having a different frequency and polarization plane can also be multiplexed/demultiplexed by forming plural kinds of resonators having a difference in parameters such as the shape, size and position in the vicinity of the waveguide. According to the present invention, the width of the complete PBG can be made larger than that of the conventional method, so that the number of frequencies (or wavelengths) in which the TE-polarized light and the TM-polarized light can be both multiplexed/demultiplexed can be increased, and thereby a transmission amount of information in the WDM per unit time can be increased.

The invention claimed is:

1. A two-dimensional photonic crystal comprising a body including a slab-shaped birefringent material, wherein:
   the direction of the birefringent material is set so that a refractive index for light whose electric field oscillates in a direction vertical to the body differs from a refractive index for light whose electric field oscillates in a direction parallel to the body;
   multiple numbers of modified refractive index areas whose refractive index differs from that of the body are periodically arranged in the body;
   a shape and arrangement of the modified refractive index areas are set so that a photonic band gap for the TM-polarized light and a photonic band gap for the TE-polarized light have a common energy region; and
   a resonator consisting of a point-like defect of the modified refractive index areas is formed in the body.

2. The two-dimensional photonic crystal according to claim 1, wherein the modified refractive index area has a 3m-symmetrical shape.

3. The two-dimensional photonic crystal according to claim 1, wherein the modified refractive index area includes a hole.

4. The two-dimensional photonic crystal according to claim 1, wherein the birefringent material is rutile.

5. The two-dimensional photonic crystal according to claim 1, wherein the birefringent material has an oriented columnar structure.

6. The two-dimensional photonic crystal according to claim 5, wherein the oriented columnar structure consists of Si.

7. The two-dimensional photonic crystal according to claim 1, wherein a waveguide consisting of a linear defect of the modified refractive index areas is formed in the body.

8. A two-dimensional photonic crystal comprising a body including a slab-shaped birefringent material, wherein
   the direction of the birefringent material is set so that a refractive index for light whose electric field oscillates in a direction vertical to the body differs from a refractive index for light whose electric field oscillates in a direction parallel to the body,
   multiple numbers of modified refractive index areas whose refractive index differs from that of the body are periodically arranged in the body,
   a shape and arrangement of the modified refractive index areas are set so that a photonic band gap for the TM-polarized light and a photonic band gap for the TE-polarized light have a common energy region,
   the modified refractive index area has a 3m-symmetrical shape, and
   a resonator consisting of a point-like defect of the modified refractive index areas is formed in the body.

9. The two-dimensional photonic crystal according to claim 8, wherein the modified refractive index area includes a hole.

10. The two-dimensional photonic crystal according to claim 8, wherein the birefringent material is rutile.

11. The two-dimensional photonic crystal according to claim 8, wherein the birefringent material has an oriented columnar structure.

12. The two-dimensional photonic crystal according to claim 8, wherein a waveguide consisting of a linear defect of the modified refractive index areas is formed in the body.

* * * * *